United States Patent
Tomomori et al.

(10) Patent No.: US 9,498,933 B2
(45) Date of Patent: Nov. 22, 2016

(54) SURFACE-TREATED METAL SHEET AND PROCESS FOR PRODUCING FORMED ARTICLE FROM THE SURFACE-TREATED METAL SHEET

(75) Inventors: Tatsuo Tomomori, Yamaguchi (JP); Koh Yoshioka, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 640 days.

(21) Appl. No.: 13/521,037

(22) PCT Filed: Dec. 28, 2010

(86) PCT No.: PCT/JP2010/007600
§ 371 (c)(1),
(2), (4) Date: Dec. 24, 2012

(87) PCT Pub. No.: WO2011/083559
PCT Pub. Date: Jul. 14, 2011

(65) Prior Publication Data
US 2013/0086971 A1    Apr. 11, 2013

(30) Foreign Application Priority Data
Jan. 8, 2010 (JP) .................. 2010-003413

(51) Int. Cl.
*B32B 15/01* (2006.01)
*C25D 5/14* (2006.01)
(Continued)

(52) U.S. Cl.
CPC ........... *B32B 15/015* (2013.01); *B32B 15/018* (2013.01); *C25D 5/14* (2013.01); *C25D 5/18* (2013.01);
(Continued)

(58) Field of Classification Search
CPC ................. B32B 15/015; B21D 31/00; H01M 2/087; H01M 2/0275; H01M 2/0292;
(Continued)

(56) References Cited

U.S. PATENT DOCUMENTS 3,355,263 A * 11/1967 Du Rose .................. C25D 5/14
205/176
5,840,441 A * 11/1998 Hirofumi .................. B21B 3/02
429/164

FOREIGN PATENT DOCUMENTS

JP    63-282290 A    11/1988
JP    2-90660 A      11/1990
(Continued)

OTHER PUBLICATIONS

Tang, P.T. Improved corrosion resistance of pulse plated nickel through crystallisation control. Journal of Applied Electrochemistry, vol. 25, 1995, p. 347-352.*
(Continued)

*Primary Examiner* — Peter DungBa Vo
*Assistant Examiner* — John S Lowe
(74) *Attorney, Agent, or Firm* — Intellectual Property Law Group LLP

(57) ABSTRACT

Provided are a surface-treated metal sheet which includes a nickel layer having improved corrosion resistance and a method of manufacturing a formed article. In a surface-treated metal sheet where a nickel layer is formed on a substrate, the proportion of (200) planes to a total of (111) planes, (200) planes, (220) planes and (311) planes with respect to the crystal plane orientations of the nickel layer is set to 40% or less. In a method of manufacturing a formed article using a surface-treated metal sheet where a nickel layer is formed on a substrate, the surface-treated metal sheet having the nickel layer where the proportion of (200) planes to a total of (111) planes, (200) planes, (220) planes
(Continued)

and (311) planes is set to 40% or less with respect to the crystal plane orientations of the nickel layer is worked using a mold.

3 Claims, 5 Drawing Sheets

(51) Int. Cl.
| | |
|---|---|
| C25D 5/18 | (2006.01) |
| H01M 2/08 | (2006.01) |
| H01M 2/02 | (2006.01) |
| C25D 3/12 | (2006.01) |
| C25D 5/12 | (2006.01) |
| C25D 7/04 | (2006.01) |
| C25D 21/12 | (2006.01) |
| B21D 31/00 | (2006.01) |
| C25C 3/12 | (2006.01) |
| C25D 5/36 | (2006.01) |

(52) U.S. Cl.
CPC ............ *H01M 2/0287* (2013.01); *B21D 31/00* (2013.01); *C25C 3/12* (2013.01); *C25D 5/12* (2013.01); *C25D 5/36* (2013.01); *C25D 7/04* (2013.01); *C25D 21/12* (2013.01); *H01M 2/0285* (2013.01); *Y10T 428/12944* (2015.01)

(58) Field of Classification Search
CPC .................. H01M 10/24; C23C 10/60; C23C 28/021; C23C 28/023; C23C 28/028; C23C 30/00; C25D 5/14; C25D 5/50; Y10T 428/12951; Y10T 428/12937; Y10T 428/12931
USPC ...................... 428/638, 679–684, 615; 72/47
See application file for complete search history.

(56) References Cited

FOREIGN PATENT DOCUMENTS

| | | |
|---|---|---|
| JP | 5-033189 A | 2/1993 |
| JP | 6-248490 A | 9/1994 |
| JP | 7-300695 A | 11/1995 |
| JP | 11-61484 A | 3/1999 |
| JP | 2003-277886 A | 10/2003 |
| JP | 2008-156738 A | 7/2008 |

OTHER PUBLICATIONS

Tang, P.T. Improved corrosion resistance of pulse plated nickel through crystallisation control. Journal of Applied Electrochemistry, vol. 25, 1995, pp. 347-352.*
International Search Report with English translation, mailing date Apr. 5, 2011, for corresponding International Application No. PCT/JP2010/007600.

* cited by examiner

Orientation rate of 200 plane: low (random structure)

Orientation rate of 200 plane: high (columnar structure)

SURFACE-TREATED METAL SHEET AND PROCESS FOR PRODUCING FORMED ARTICLE FROM THE SURFACE-TREATED METAL SHEET

CROSS-REFERENCE TO RELATED APPLICATIONS

This application is a U.S. National Phase application, under 35 U.S.C. §371, of International Application no. PCT/JP2010/007600, with an international filing date of Dec. 28, 2010, and claims benefit of Japanese Application no. 2010-003413 filed on Jan. 8, 2010, and which are hereby incorporated by reference for all purposes.

TECHNICAL FIELD

The present invention relates to a surface-treated metal sheet having a nickel layer where the crystal orientation on the (200) plane is suppressed and a method of manufacturing a formed article using the surface-treated metal sheet.

BACKGROUND ART

Conventionally, electro nickel plating has been popularly used for an ornamental purpose or for a corrosion prevention purpose, and is particularly used in the manufacture of battery cans, pipes and the like.

For example, a battery can is formed by drawing and, is usually manufactured through many steps using water-soluble emulsion as a lubricant for pressing. Here, it is necessary to apply a film which can withstand press forming to a surface of the battery can which constitutes an outer surface. Further, a problem which occurs during the formation of a battery can by press forming, is the lowering of a lifetime of a mold due to wear of the mold caused by the nickel powder in nickel plating. The problem largely influences the productivity of the battery can and hence, there has been a demand for a surface-treated metal sheet which is provided with a hard nickel plating film which does not generate nickel powder on a surface of a battery can which constitutes an outer surface.

For this end, as disclosed in patent document 1, there has been proposed a surface-treated metal sheet which can enhance surface hardness by firstly applying nickel plating to a metal sheet and, thereafter, by forming a tin-nickel diffusion layer on a nickel plating layer.

On the other hand, in preventing the corrosion of a steel substrate material or a zinc alloy substrate material by nickel plating having electrically noble potential more than these materials, when a pore exists in the nickel plating layer, the corrosion of the substrate material progresses. Accordingly, it is necessary for nickel plating to make the number of pores (pinholes) which reach the substrate material as small as possible. Although it depends on a state of a substrate material, to prevent the formation of pin holes in nickel plating, it is difficult to prevent lowering of corrosion resistance caused by pin holes in plating unless a use amount of a nickel plating weight is increased to a region where the manufacture of a surface-treated metal sheet is not economical. In view of the above, it is necessary for a nickel plated steel sheet which aims at the prevention of corrosion to reduce the number of pores in a nickel plated steel sheet as much as possible.

To cope with this situation, as disclosed in patent document 2, there has been proposed a method which forms a triion tetraoxide layer in a pin hole portion formed in plating by carrying out immersion treatment where a ferrous material is immersed into an alkali solution containing oxidizing agent such as sodium nitrite or potassium acetate after nickel plating or anode electrolytic treatment.

PATENT DOCUMENT

Patent document 1: JP-A-7-300695
Patent document 2: JP-A-5-33189

SUMMARY OF THE INVENTION

Problems that the Invention is to Solve

It is an object of the present invention to provide a surface-treated metal sheet which enhances corrosion resistance thereof and a method of manufacturing a formed article using the surface-treated metal sheet Means for Solving the Problems (1) A surface-treated metal sheet according to claim 1 is a surface-treated metal sheet where a nickel layer is formed on a substrate, wherein the surface-treated metal sheet having the nickel layer where, with respect to the crystal plane orientations of the nickel layer, the proportion of the (200) plane to (111) plane, (200) plane, (220) plane and (311) plane is 40% or less. Provided that the condition that the proportion of the (200) plane in the nickel layer is 40% or less is satisfied, the nickel layer may contain a trace amount of other elements. Further, provided that the condition that the proportion of the (200) plane in the nickel layer is 40% or less is not violated, heat treatment, temper rolling or the like may be applied to the surface-treated metal sheet.

(2) The surface-treated metal sheet according to claim 2 is, in the above-mentioned (1), characterized in that the nickel layer is a dull nickel layer.

(3) The surface-treated metal sheet according to claim 3 is, in the above-mentioned (1), characterized in that a metal layer is formed as a layer below the nickel layer.

(4) The surface-treated metal sheet according to claim 4 is, in the above-mentioned (1), characterized in that a metal layer is formed as a layer above the nickel layer. Even when the corrosion resistance of the metal layer which is the layer above the nickel layer is bad, the surface-treated metal sheet can enhance the corrosion resistance by having the nickel layer below the metal layer.

(5) The surface-treated metal sheet according to claim 5 is, in anyone of the above-mentioned (1) to (4), characterized in that the substrate is a steel sheet.

(6) The surface-treated metal sheet according to claim 6 is, in the above-mentioned (5), characterized in that the surface-treated metal sheet is a steel sheet for forming a battery can.

(7) The surface-treated metal sheet according to claim 7 is, in the above-mentioned (5), characterized in that the surface-treated metal sheet is a steel sheet for forming a pipe.

(8) A method of manufacturing a formed article according to claim 8 is a method of manufacturing a formed article using a surface-treated metal sheet where a nickel layer is formed on a substrate, wherein the surface-treated metal sheet having the nickel layer where the proportion of the (200) plane to a total of the (111) plane, (200) plane, (220) plane and (311) plane is 40% or less with respect to the crystal plane orientations of the nickel layer is worked using a mold.

(9) The method of manufacturing a formed article according to claim 9 is, in the above-mentioned (8), characterized in that the formed article is a battery can.

(10) The method of manufacturing a formed article according to claim 10 is, in the above-mentioned (8), characterized in that the formed article is a pipe.

Advantageous Effects of the Invention

The surface-treated metal sheet described in claim 1 has a small number of pin holes in the nickel layer and hence, the surface-treated metal sheet possesses excellent corrosion resistance. Further, the nickel layer is hard and hence, the surface-treated metal sheet possesses excellent surface hardness. Accordingly, the surface-treated metal sheet can suppress wear of a mold by suppressing the generation of nickel powder at the time of press forming.

The method of manufacturing a formed article described in claim 8 where working is performed using a mold is a method of manufacturing a formed article using the above-mentioned surface-treated metal sheet and hence, nickel layer is hard and hence, the formed article possesses excellent surface hardness, and the method can suppress wear of a mold by suppressing the generation of nickel powder at the time of press forming.

BRIEF DESCRIPTION OF THE DRAWINGS

FIG. 2 is an explanatory view schematically showing the structure of the nickel layer of the surface-treated metal sheet, wherein

MODE FOR CARRYING OUT THE INVENTION

Figure 1A:
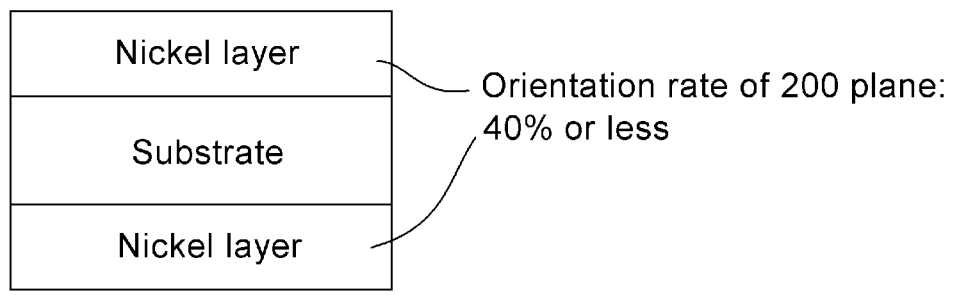
FIG. 1(a) is across-sectional view showing the constitution of a surface-treated metal sheet having a nickel layer.

FIG. 1(a) is a cross-sectional view showing the constitution of a surface-treated metal sheet having a nickel layer.

Hereinafter, the surface-treated metal sheet according to the present invention is explained in detail in conjunction with an embodiment.

<Substrate>

A steel sheet can be named as a substrate for the surface-treated metal sheet and, usually, a low carbon aluminum-killed hot-rolled coil is used as the substrate for the surface-treated metal sheet.

Further, a coil which is manufactured using ultra-low carbon steel which contains 0.003 weight % or less of carbon, or a coil which is manufactured using non-aging continuous cast steel obtained by adding niobium and titanium to the ultra-low carbon steel is also used.

<Pretreatment>

As pretreatment before surface treatment, usually, a scale (oxide film) formed on a surface of a cold-rolled steel sheet is removed by applying electrolytic cleaning or cleaning by immersion to the cold-rolled steel sheet using an alkali solution containing caustic soda as a main agent. After the scale is removed, the steel sheet is rolled to a product thickness in a cold-rolling step.

<Annealing>

After rolling oil which adheres to the steel sheet in rolling is cleaned by electrolytic cleaning, the steel sheet is annealed. Annealing may be performed by either one of continuous annealing and box annealing, and is not limited specifically. After annealing is applied to the steel sheet, a shape of the steel sheet is modified.

<Surface Treatment>

Next, surface treatment is applied to the substrate. As the surface treatment, although any treatment is available provided that orientation rate of the (200) plane is controlled to 40% or less, nickel plating is preferably used. As a kind of nickel plating, when the surface treatment is carried out using bright plating, even when current density is not controlled, the proportion of the (200) plane can be easily set to 40% or less. However, when the surface treatment is carried out using dull plating, although described in detail later, it is necessary to perform a control of lowering current density. However, when the surface treatment is carried out using bright plating, due to the addition of a sulfur compound or the like, for example, there exists a possibility that corrosion resistance of a surface-treated steel sheet is lowered in a salt water spray test or the like and hence, the dull plating is more preferable compared to the bright plating.

As a nickel plating bath, a nickel sulfate bath which is referred to as a watt bath is used in many cases. However, a sulfamic acid bath, a borofluoride bath, a chloride bath or the like may be used besides the nickel sulfate bath. In performing plating using such a bath, it is preferable to set a coating weight of nickel to a value which falls within a range from 0.5 to 5.0 µm.

As an electrolytic condition for obtaining such a plating thickness, for example, when nickel plating is applied using a watt bath which is a typical example, the plating thickness can be obtained under electrolytic conditions where the bath composition contains 200 to 350 g/l of nickel sulfate, 20 to 50 g/l of nickel chloride and 20 to 50 g/l of a boric acid, a pH is 3.6 to 4.6, a bath temperature is 40 to 70° C., and a current density is 1 to 40 A/dm$^2$. Further, a boric acid which is added as a stabilizer may be replaced with a citric acid, and the usage of a citric acid can obtain a harder nickel film compared to a case where a boric acid is used.

In performing the above-mentioned dull nickel plating, an orientation rate of nickel on the (200) plane is changed by controlling current density. That is, the orientation rate of the peak on the (200) plane in peaks obtained by an X-ray diffraction analysis is suppressed by lowering current density, while the orientation rate of the peak on the (200) plane in peaks obtained by an X-ray diffraction analysis is adopted with priority by increasing current density. It is considered that when current density is low, the plane orientation is suppressed in electrodeposition of nickel which becomes seeds made of a complex (boric acid nickel complex in case of a watt bath). Accordingly, it is considered that nickel precipitates at random when current density is low, and the electrodeposition of nickel in one direction is generated along the (200) plane when current density is high.

The orientation rate of the (200) plane is calculated by a method where the orientation rate is calculated based on a result of an X-ray diffraction analysis. In the X-ray diffraction analysis, the measurement is performed using an automatic X-ray diffraction analyzer (RINT2500/PC) made by Rigaku Corporation under conditions of X-rays: Cu-40 kV-200 mA, divergent slit: 2 degree, scattering slit: 1 degree, light receiving slit: 0.3 mm. A measurement range is set to 40°≤2θ≤90°.

<Measurement of Orientation Rate>

When nickel is analyzed by an X-ray diffraction analysis, nickel mainly has the orientation on four planes, that is, the (111) plane, (200) plane, (220) plane and (311) plane, and peaks of orientations on the respective planes can be confirmed at 2θ of 44.5°, 51.8°, 76.3°, and 92.9° respectively. With respect to the relative intensity ratios of these planes, assuming a relative intensity ratio of the (111) plane as 100, the relative intensity ratio of the (200) planes is 42.0, the relative intensity ratio of the (220) plane is 21.0, and the relative intensity ratio of the (311) plane is 20.0. The intensity of a base line is subtracted from the maximum peak intensities (cps) of the respective planes and, thereafter, the intensities obtained by subtraction are corrected using the respective relative intensity ratios. Using the corrected values, the orientation rate of the (200) plane is obtained by calculating a rate at which the (200) plane occupies in the whole four planes (maximum peak intensity of the (200) plane/total of maximum peak intensities of (111) plane+(200) plane+(220) plane+(311) plane.

The fact that the orientation rate of the (200) plane is high implies that nickel grains has columnar structure based on a directional exponent of X-rays. On the other hand, it is considered that the fact that the orientation rate on the (200) plane is low, that is, the orientation rates on the (111) plane, (220) plane and (311) plane are high implies that nickel grains are oriented at random in a plating film.

Figure 2A:
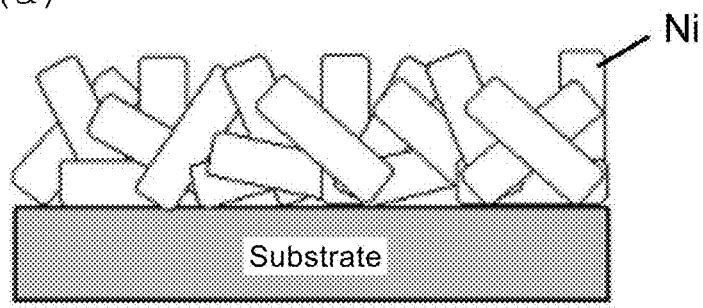
FIG. 2(a) is a view showing the surface-treated metal sheet having the structure where orientation rate of the (200) plane is randomized.
Figure 2B:
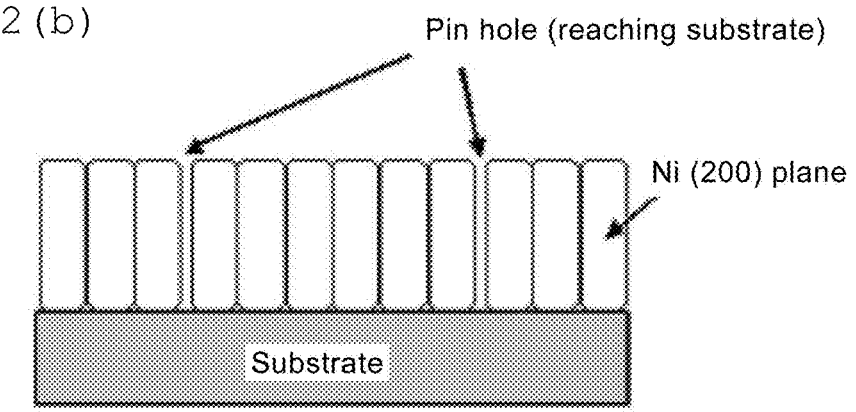
FIG. 2(b) is a structural view showing the columnar structure where orientation rate of the (200) plane is high.

As shown in FIG. 2(*a*) and FIG. 2(*b*) which are schematic views, it is considered that compared to the columnar structure which exhibits the high orientation rate on the (200) plane (FIG. 2(*b*)), the structure where nickel grains are oriented at random (FIG. 2(*a*)) can suppress pin holes, that is, the exposure of an iron substrate material which constitutes a background can be suppressed so that the corrosion resistance of a surface-treated metal sheet can be enhanced.

Further, it is also considered that since nickel grains are oriented at random, the number of boundaries which exist in the direction perpendicular to a surface layer, that is, in the same direction as the (200) plane can be reduced so that surface hardness is also enhanced.

The above-mentioned advantageous effects of the present invention can be realized when the substrate is uniformly covered with the layer where the proportion of the (200) plane is suppressed. Further, the larger a thickness of the nickel layer, the more the corrosion resistance is enhanced and hence, it is preferable that the nickel layer has a larger thickness from a viewpoint of corrosion resistance.

However, to acquire a large plating thickness with low current density, it is necessary to prolong an energization time and hence, the formation of a dull nickel plating layer with low current density may deteriorate productivity. Particularly in case of the continuous production such as the "Roll to Roll" production, a line speed is remarkably lowered and hence, productivity is deteriorated.

Figure 1B:
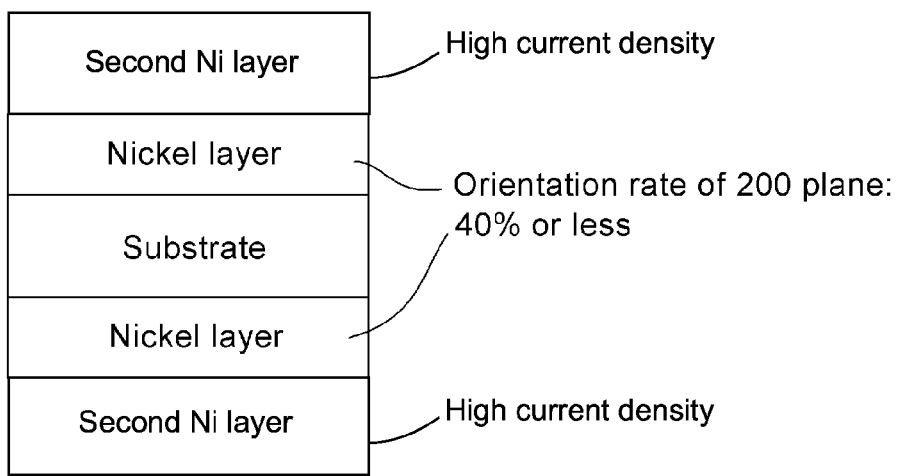
FIG. 1(b) is a cross-sectional view showing the constitution of a surface-treated metal sheet having a nickel layer and a second metal layer formed above the nickel layer.
Figure 1C:
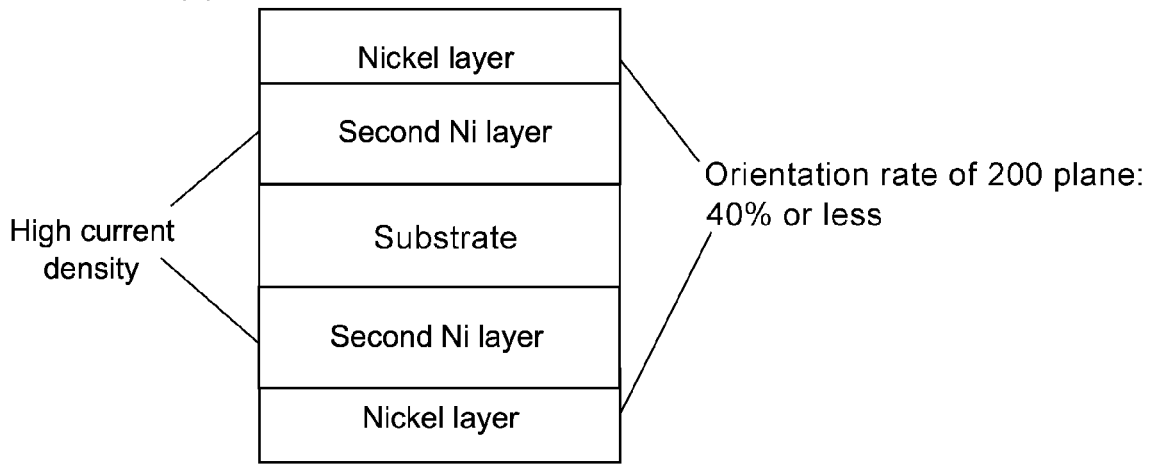
FIG. 1(c) is a cross-sectional view showing the constitution of a surface-treated metal sheet having a nickel layer and a second metal layer formed below the nickel layer.

Accordingly, to take into account productivity by estimating an actually used material, such a drawback can be overcome by forming a metal layer above or below a nickel layer where the proportion of the (200) plane is suppressed. That is, provided that a substrate is uniformly covered with a nickel layer where the proportion of the (200) plane is suppressed, the corrosion resistance which is an advantageous effect of the invention described in claim 1 can be realized and hence, another metal layer may be formed above or below the nickel layer as an upper layer or a lower layer. See FIG. 1(*b*) and FIG. 1(*c*). For example, in the "Roll to Roll" continuous production using dull nickel plating, such continuous production can be realized using (in combination), a nickel plating layer which is formed with low current density at a level where the proportion of the (200) plane becomes 40% or less and a nickel plating layer which is formed with high current density for having a fixed plating thickness larger than a plating thickness of the nickel plating layer formed with low current density. Here, provided that uniform coating of the nickel layer on the substrate with low current density is ensured, it is possible to adopt either one of a case where the nickel layer formed with low current density is provided as a lower layer and the nickel layer formed with high current density is provided as an upper layer (FIG. 1(*b*)), and a case where the nickel layer formed with low current density is provided as an upper layer and the nickel layer formed with high current density is provided as a lower layer (FIG. 1(*c*)).

<Evaluation Method 1>

Nickel plated steel sheets having a nickel film thickness of 3.0 μm are prepared in such a manner that the orientation rate of the (200) plane of a nickel layer is changed among the respective nickel plated steel sheets, and the investigation of surface hardness is carried out in accordance with Vickers hardness (JIS Z 2244). A micro hardness meter (type: MVK-G2) made by AKASHI is used in the measurement of Vickers hardness.

From a result of many experiments, it is found that a plating film is hardened by lowering the orientation rate of the (200) plane of the nickel layer to 40% or less. It is also found that the plating film exhibits high surface hardness by setting the orientation rate of the (200) plane of the nickel layer to 30% or less.

When the orientation rate of the (200) plane of the nickel layer is less than 5%, it is extremely difficult to prepare the nickel plated steel sheet by plating in a stable manner, and also cleanliness in appearance is deteriorated. Accordingly, it is preferable to set the orientation rate of the (200) plane of the nickel layer to 5% or more.

On the other hand, when the orientation rate of the (200) plane of the nickel layer exceeds 40%, surface hardness of the nickel layer is lowered.

Accordingly, from a viewpoint of surface hardness, the orientation rate of the (200) plane of the nickel layer is preferably set to 40% or less, more preferably 30% or less, still more preferably 5 to 40%, and still further preferably 5 to 30%.

<Evaluation Method 2>

Nickel plated steel sheets having a nickel film thickness of 3.0 μm are prepared in such a manner that an orientation rate of the (200) plane of a nickel layer is changed among the respective nickel plated steel sheets, and the corrosion resistance is investigated in accordance with a salt water spray test (JIS Z 2371).

The corrosion resistance is confirmed based on the number of red rusts (the number of pin holes formed in a plating film) after salt water spraying is performed for 4 hours.

From a result of many experiments, it is found that the number of pin holes in plating is decreased by lowering the orientation rate of the (200) plane of the nickel layer to 40% or less. It is also found that the steel sheet exhibits excellent pin hole reduction effect in the salt water spray test by preferably setting the orientation rate of the (200) plane of the nickel layer to 30% or less.

When the orientation rate of the (200) plane of the nickel layer is less than 5%, it is extremely difficult to prepare the nickel plated steel sheet by plating in a stable manner, and also cleanliness in appearance is deteriorated. Accordingly, it is preferable to set the orientation rate of the (200) plane of the nickel layer to 5% or more.

On the other hand, when the orientation rate of the (200) plane of the nickel layer exceeds 40%, the number of pin holes formed in plating is increased so that the corrosion resistance of the nickel plated steel sheet is deteriorated. Further, large irregularities are found in properties and hence, it is difficult for the nickel plated steel sheets to acquire stable properties.

Accordingly, from a viewpoint of corrosion resistance, the orientation rate of the (200) plane of the nickel layer is preferably set to 40% or less, more preferably to 30% or less, still more preferably to 5 to 40%, and still further preferably to 5 to 30%.

<Manufacture of Battery Can>

As one example of a formed article, a battery can which is manufactured using a nickel plated steel sheet manufactured by a manufacturing method of the present invention is named.

A forming method of the battery can is forming by drawing, wherein usually, a water soluble emersion is used as a press lubricant, a cup is formed through 1 step and, thereafter, the cup is subjected to working through 3 to 6 steps in total so as to have a desired diameter of a battery can, and the cup is further subjected to working through 4 steps and thereby the battery can is manufactured.

With respect to a press working condition, the battery can is formed such that a thickness of a can wall is increased in the direction toward an opening portion of the battery can on which an anode cap is mounted from a bottom of the battery can (a cathode terminal portion). That is, the can is formed by molding such that the film thickness of the can wall in each step is increased in the direction toward the opening portion from the bottom of the can.

Although a sintered hard alloy is preferable as a material of a mold used in such press forming, a material for forming the mold is not particularly limited.

<Manufacture of Pipe>

A pipe is manufactured in such a manner that a steel sheet to which the above-mentioned plating is applied is used, a shape of the steel sheet is modified using a leveler, the steel sheet is slit into a plurality of strip sheets having a predetermined outer size using a slitter and, thereafter, the strip sheet is formed into a pipe shape by a forming machine, and edge surfaces of the strip sheet are welded to each other by high frequency induction welding so that a pipe is manufactured.

EXAMPLE

The present invention is further explained in more detail using the following examples hereinafter.

Example 1

A low carbon aluminum-killed steel sheet having a sheet thickness of 0.25 mm which is manufactured through cold-rolling and annealing is used as a substrate.

The composition of a steel sheet which constitutes the substrate is as follows.

C: 0.045% (mass %, applicable to other components), Mn: 0.23%, Si: 0.02%, P: 0.012%, S: 0.009%, Al: 0.063%, N: 0.0036%, balance: Fe and unavoidable impurities The steel sheet is subjected to alkali electrolytic degreasing and pickling by immersion into a sulfuric acid and, thereafter, dull plating is applied to the steel sheet by a watt bath under conditions where a bath temperature is set to 60° C. and current density is set to 10 A/dm$^2$. A thickness of nickel plating is set to 3.0 μm.

Examples 2 to 11, Comparison Examples 1 to 11

Nickel plated steel sheets are manufactured under conditions where a bath temperature and current density are changed from the bath temperature and the current density of the example 1, and other conditions are set equal to the conditions used in the example 1. Nickel plated steel sheets of examples 9 to 11 and comparison examples 10 and 11 are prepared such that nickel plating is applied to these steel sheets and, thereafter, heat treatment is applied to these steel sheets in non-oxidizing atmosphere at a temperature of 700° C. for 1 minute.

Figure 3:
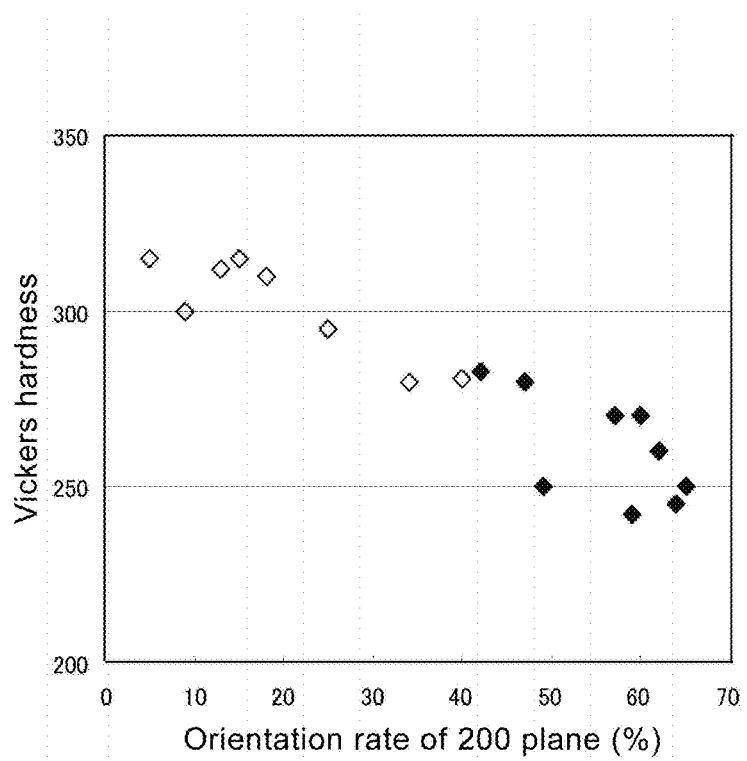
FIG. 3 is a graph showing a result of measurement of Vickers hardness with respect to a nickel plating steel sheet where orientation rate of the (200) plane is changed.
Figure 4:
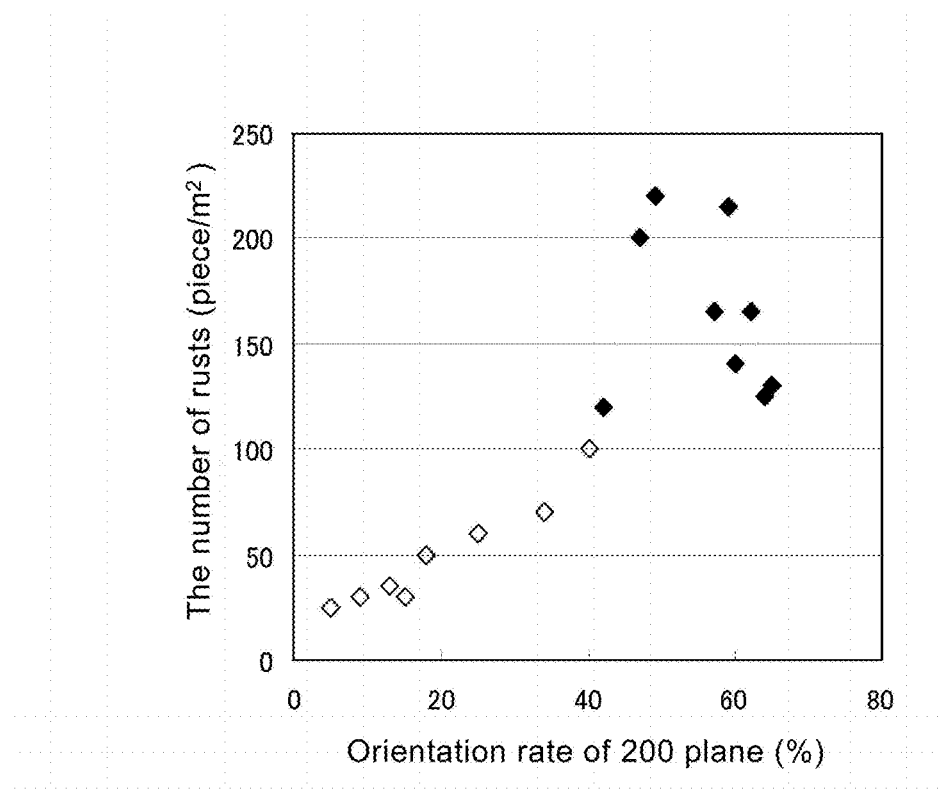
FIG. 4 is a graph showing a result of applying salt water spray test to the nickel plating steel sheet where orientation rate of the (200) plane is changed.

A result obtained by measuring Vickers hardness of the respective nickel plated steel sheets where the orientation rate of the (200) plane is changed and a result of a salt spray test (4 hours) are shown in Table 1. Further, these results are shown in FIG. 3 and FIG. 4 in the form of graph.

TABLE 1

| | orientation rate of (200) planes | Vickers hardness | number of rusts (pieces/m$^2$) | bath temperature (60° C.) | current density (A/dm$^2$) | pH | stirring by air | heat treatment time |
|---|---|---|---|---|---|---|---|---|
| example 1 | 5 | 315 | 25 | 60 | 1 | 4.3 | performed | — |
| example 2 | 9 | 300 | 30 | 70 | 1 | 4.3 | performed | — |
| example 3 | 13 | 312 | 35 | 70 | 3 | 4.3 | performed | — |
| example 4 | 15 | 315 | 30 | 60 | 3 | 4.3 | performed | — |
| example 5 | 18 | 310 | 50 | 50 | 1 | 4.3 | performed | — |
| example 6 | 25 | 295 | 60 | 70 | 5 | 4.3 | performed | — |
| example 7 | 34 | 280 | 70 | 50 | 3 | 4.3 | performed | — |
| example 8 | 40 | 281 | 100 | 70 | 7 | 4.3 | performed | — |
| example 9 | 5 | 260 | 40 | 60 | 1 | 4.3 | performed | 700° C. × 1 min |
| example 10 | 19 | 216 | 55 | 60 | 3 | 4.3 | performed | 700° C. × 1 min |
| example 11 | 39 | 195 | 80 | 60 | 5 | 4.3 | performed | 700° C. × 1 min |
| comparison example 1 | 42 | 283 | 120 | 50 | 30 | 4.3 | performed | — |
| comparison example 2 | 47 | 280 | 200 | 60 | 5 | 4.3 | performed | — |
| comparison example 3 | 49 | 250 | 220 | 60 | 30 | 4.3 | performed | — |

TABLE 1-continued

|  | orientation rate of (200) planes | Vickers hardness | number of rusts (pieces/m²) | bath temperature (60° C.) | current density (A/dm²) | pH | stirring by air | heat treatment time |
|---|---|---|---|---|---|---|---|---|
| comparison example 4 | 57 | 270 | 165 | 50 | 20 | 4.3 | performed | — |
| comparison example 5 | 59 | 242 | 215 | 60 | 20 | 4.3 | performed | — |
| comparison example 6 | 60 | 270 | 140 | 50 | 5 | 4.3 | performed | — |
| comparison example 7 | 62 | 260 | 165 | 70 | 10 | 4.3 | performed | — |
| comparison example 8 | 64 | 245 | 125 | 60 | 10 | 4.3 | performed | — |
| comparison example 9 | 65 | 250 | 130 | 70 | 20 | 4.3 | performed | — |
| comparison example 10 | 57 | 185 | 145 | 60 | 10 | 4.3 | performed | 700° C. × 1 min |
| comparison example 11 | 64 | 179 | 160 | 60 | 20 | 4.3 | performed | 700° C. × 1 min |

<Evaluation>

It is found that the nickel plated steel sheets of the examples 1 to 11 of the present invention where the orientation rate of the (200) plane is 40% or less can obtain, as shown in Table 1 and FIG. 3, a hardened plating film in a stable manner. Further, as shown in Table 1 and FIG. 4, the number of rusts is small so that the nickel plated steel sheets of the examples 1 to 11 of the present invention exhibit excellent corrosion resistance.

Further, even when heat treatment is performed after nickel plating, the nickel plated steel sheets of the examples 9 to 11 where the orientation rate of the (200) plane is 40% or less are excellent in both hardness and corrosion resistance compared with the nickel plated steel sheets of the comparison examples 10 and 11 where the orientation rate of the (200) plane exceeds 40%. That is, although a diffusion layer is formed between the steel sheet which constitutes a substrate and the nickel plating layer by performing heat treatment after nickel plating, provided that the orientation rate of the (200) plane of the nickel layer is 40% or less, even when the diffusion layer exists, the excellent properties of the nickel plated steel sheets of the present invention is not jeopardized.

Accordingly, it is safe to say that a battery can and a pipe which are manufactured using the nickel plated steel sheet of the example of the present invention also exhibit excellent corrosion resistance. Further, the nickel plated steel sheet of the example of the present invention, as can be clearly understood from Table 1 and FIG. 3, also exhibits sufficiently high hardness and hence, wear of a mold can be suppressed by suppressing the generation of nickel powder at the time of press forming.

INDUSTRIAL APPLICABILITY

According to the present invention, by controlling the orientation rate of the (200) plane of the nickel layer, it is possible to provide a surface-treated metal sheet exhibiting excellent surface hardness and corrosion resistance, a battery can and a pipe member which are manufactured using the surface-treated metal sheet and hence, the present invention has extremely high industrial applicability.

What is claimed is:

1. A surface-treated sheet of a battery can, comprising:
   a steel sheet;
   a first nickel layer formed on the steel sheet, wherein an orientation rate of the (200) plane with respect to the crystal plane orientations of the nickel layer is set to 5 to 30%; and
   a second nickel layer formed above or below the first nickel layer, the second nickel layer contacting the first nickel layer, an orientation rate of the (200) plane with respect to the crystal plane orientations of the second nickel layer being higher than that of the first nickel layer,
   wherein the first nickel layer and the second nickel layer are dull nickel plated, and
   wherein the first nickel layer or the second nickel layer, each having an upper surface, the entire upper surface of said first nickel layer or said second nickel layer is exposed as an outermost surface of the surface-treated sheet.

2. A surface-treated sheet of a battery can, according to claim 1, further comprising:
   a diffusion layer formed between the steel sheet and the first nickel layer or the second nickel layer.

3. A surface-treated sheet of a battery can, according to claim 1, wherein the second nickel layer is formed on the first nickel layer.

* * * * *